(12) United States Patent
Guastini et al.

(10) Patent No.: US 9,550,205 B2
(45) Date of Patent: Jan. 24, 2017

(54) ELECTROMAGNETIC DEVICE FOR STABILIZING AND REDUCING THE DEFORMATION OF A STRIP MADE OF FERROMAGNETIC MATERIAL, AND RELATED PROCESS

(75) Inventors: Fabio Guastini, Dolegna del Collio (IT); Michele Minen, Udine (IT)

(73) Assignee: Danieli & C. Officine Meccaniche S.P.A., Buttrio (IT)

( * ) Notice: Subject to any disclaimer, the term of this patent is extended or adjusted under 35 U.S.C. 154(b) by 220 days.

(21) Appl. No.: 13/984,254

(22) PCT Filed: Feb. 21, 2012

(86) PCT No.: PCT/IB2012/050778
§ 371 (c)(1),
(2), (4) Date: Aug. 7, 2013

(87) PCT Pub. No.: WO2012/114266
PCT Pub. Date: Aug. 30, 2012

(65) Prior Publication Data
US 2013/0319326 A1 Dec. 5, 2013

(30) Foreign Application Priority Data
Feb. 22, 2011 (IT) ................ MI2011A0268

(51) Int. Cl.
*B05C 13/02* (2006.01)
*B65G 43/00* (2006.01)
(Continued)

(52) U.S. Cl.
CPC .......... *B05C 13/02* (2013.01); *B21B 37/007* (2013.01); *B65G 43/00* (2013.01); *C23C 2/003* (2013.01); *C23C 2/40* (2013.01); *H01F 7/06* (2013.01)

(58) Field of Classification Search
None
See application file for complete search history.

(56) References Cited

U.S. PATENT DOCUMENTS

| 6,471,153 B1 | 10/2002 | Kimura et al. |
| 2009/0045020 A1* | 2/2009 | Richeson ............... 188/161 |
| 2009/0191360 A1 | 7/2009 | Teramoto et al. |

FOREIGN PATENT DOCUMENTS

| DE | 102005060058 | | 6/2007 | |
| KR | 20010057267 | * | 4/2001 | ............. C23C 2/06 |
| WO | WO2009040234 | | 4/2009 | |

* cited by examiner

*Primary Examiner* — Dah-Wei D Yuan
*Assistant Examiner* — Jethro M Pence
(74) *Attorney, Agent, or Firm* — Stetina Brunda Garred & Brucker

(57) ABSTRACT

An electromagnetic device (1) for stabilizing and minimizing the deformation of a strip (4) made of ferromagnetic material during its feeding in a system for coating the same strip with molten metal, by applying a distribution of force which is continuous in the direction transversal to the strip regardless of the width thereof. The device comprises first electromagnets and second electromagnets mirroring the first electromagnets with respect to said theoretical pass-line (50) of said strip (4). Each electromagnet includes a core comprising one pole and one feeding coil wound about the pole. The electromagnetic device comprises a connection element (26) made of ferromagnetic material which connects the cores of the first electromagnets (15, 15', 15", 15''') and a connection element (26') made of ferromagnetic material which connects the cores of the second electromagnets (16, 16', 16", 16'''). The connection elements (26, 26') mirror the theoretical pass-line (50) of the strip (4).

14 Claims, 9 Drawing Sheets

(51) Int. Cl.
*H01F 7/06* (2006.01)
*B21B 37/00* (2006.01)
*C23C 2/00* (2006.01)
*C23C 2/40* (2006.01)

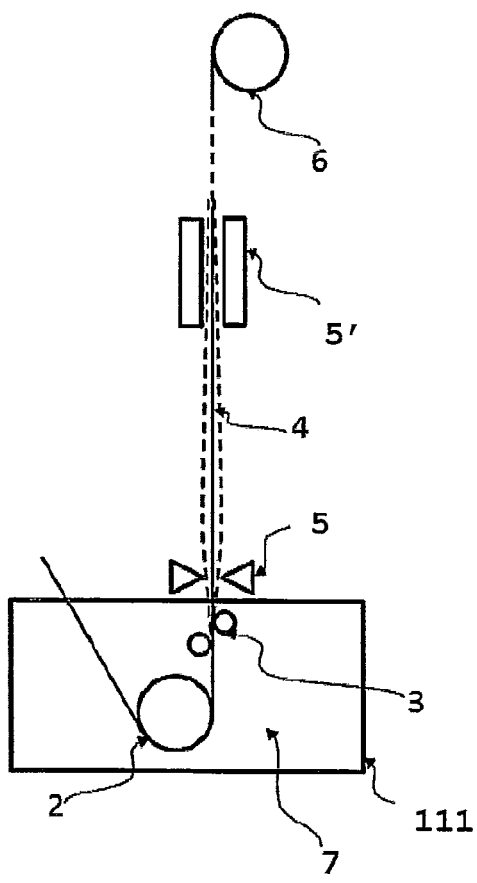
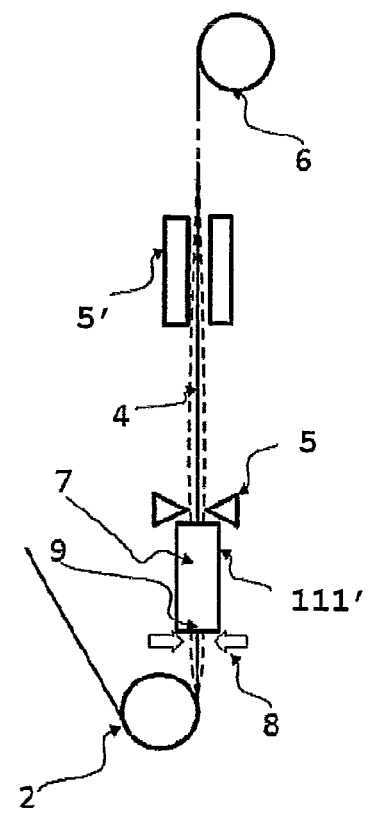
FIG. 1
FIG. 2

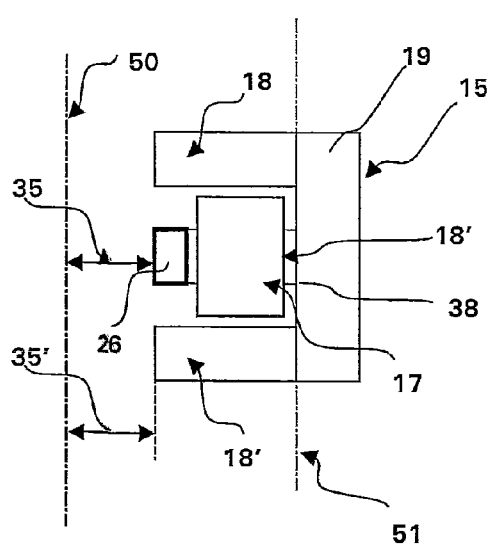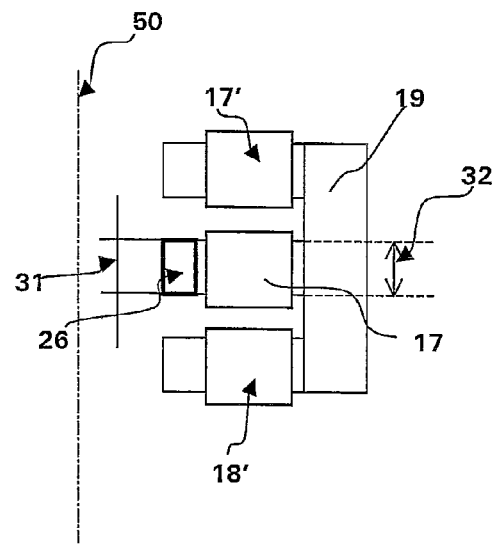
*FIG. 18*  *FIG. 19*
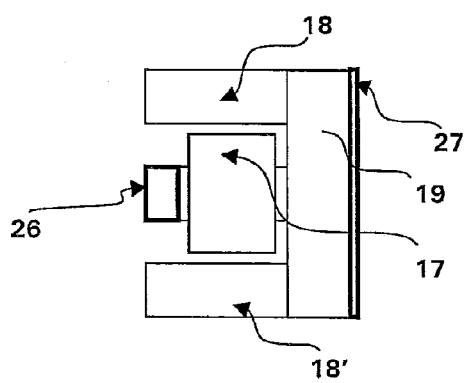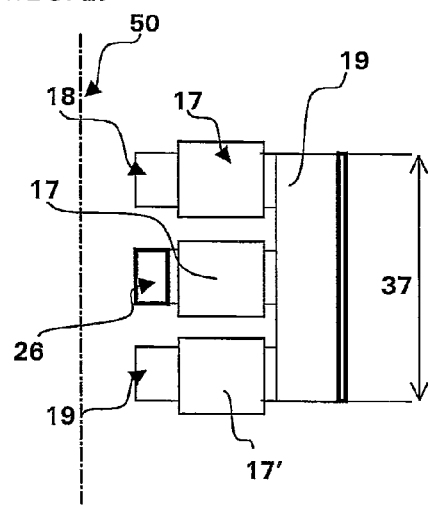
*FIG. 20*  *FIG. 21*

ELECTROMAGNETIC DEVICE FOR STABILIZING AND REDUCING THE DEFORMATION OF A STRIP MADE OF FERROMAGNETIC MATERIAL, AND RELATED PROCESS

FIELD OF THE INVENTION

The present invention falls within the scope of processes and systems for coating flat bodies made of ferromagnetic material such as a steel strip. In particular, the invention relates to a device for stabilizing a metal strip made of ferromagnetic material within the scope of a process for coating the same metal strip with molten metal (e.g. a galvanizing process). The present invention also relates to a system for coating a metal strip with molten metal comprising said electromagnetic device. Lastly, the present invention relates to a process for stabilizing and/or correcting the deformation of a strip made of ferromagnetic material, such as e.g. a metal strip.

STATE OF THE ART

As known, strips made of ferromagnetic material, such as e.g. metal strips, are coated on the outside by means of a suitable coating process. With reference to FIG. 1, a first conventional coating process provides passing the metal strip 4 in a molten metal bath 7 contained in a pot 111. The metal strip 4 enters bath 7 from the top of pot 111 at a certain inclination and is guided out of the pot in vertical direction by means of the rolls 2, 3 which are submerged in the pot. In particular, to obtain the trajectory of the metal strip 4, a roll 2 called "sink roll" is arranged, while further corrective rolls 3 are provided to partly correct the deformation of the metal strip 4, also called "crossbow", and for the partial stabilization thereof.

Installed downstream of pot 111, i.e. at the output of the molten metal bath 7, there is a unit for removing the excess coating consisting of air knives (air or inert gases) or magnetic knives 5 which wipe the surface of the metal strip 4 in order to send back the excess molten metal towards bath 7. Then, the metal strip 4 undergoes cooling by means of jet-coolers 5' arranged vertically along the transportation direction of the strip itself. Then, the metal strip 4 reaches an upper roll 6 in conditions such not to compromise the quality of the coated surface after contact with the upper roll itself. Therefore, this coating process requires that the metal strip 4 is supported vertically so as to remain tensioned only between two points, whose distance is normally between 30 and 50 meters.

With reference to FIG. 2, instead of using large molten metal pots (up to 400 tons), coating processes have recently been developed providing relatively small magnetic containment pots 111'. Such pots 111' do not contain mechanical moving parts but instead comprise an electromagnetic device 8 by means of which the molten metal bath is kept suspended while the metal strip 4 passes through the bath in vertical direction. More accurately, the metal strip 4 enters the magnetic containment pot 111' from an inlet opening 9 located on the bottom of the pot itself, then it comes out from an outlet opening opposite to the inlet opening.

In the two coating processes described and schematized in FIGS. 1 and 2, the metal strip 4 is subject to vibrations mainly caused by the presence of the jet-coolers 5' and of the knives 5. In the case of the process in FIG. 1, the clearances of the mechanical guide members employed, in particular the rolls 2, 3, are sources of vibrations, while in the case of the process in FIG. 2, the electromagnetic device 8 for the levitation of the molten metal 7 is another source of vibration. As already indicated above, in the process in FIG. 1 the metal strip is also affected by a static deformation (crossbow) due to local plasticization of the metal strip which occurs close to the submerged rolls 2, 3. This phenomenon also strongly disturbs the feeding stability of the metal strip 4. Furthermore, in the case of the process in FIG. 2, the lower free surface of the metal bath 7 may also be disturbed by the vibration of the metal strip 4 with subsequent emission of splashes of molten metal from the surface itself.

These drawbacks determine the variation of the coating thickness along the metal strip 4, with the need of providing a thicker coating with respect to the one required for the classification of the product. As indeed known, the reference standards impose a minimum threshold of the coating thickness which is not to be exceeded. The oscillations and the static deformation of the metal strip 4 indeed induce a non-uniform distribution of the coating and a reduced effectiveness of the action of the gas and/or electromagnetic knives which therefore must operate at greater distances to prevent accidental contact with the metal strip. In this regard, it is noted that usually an over-coating is provided which is at least such as to ensure the minimum threshold required on 95% of the metal strip 4. In other cases, the feeding speed of the strip is reduced with a subsequent and disadvantageous reduction in productivity.

It is also noted that in the case of the process in FIG. 2, the emission of liquid metal splashes through the inlet opening 9 of pot 111' also negatively influences the quality of the coating. In fact, such splashes stick on the activated surface of the metal strip 4 with which they instantly react before entering the metal bath 7. Such a phenomenon generates points with different alloy composition on the surface of the metal strip 4 and therefore a poor quality of the metal strip 4.

Therefore the above considerations reveal the need to reduce the oscillations and deformations on the metal strip 4 as much as possible during the related coating process and in particular, during the feeding thereof upstream and/or downstream of the pot containing the molten metal. Electromagnetic device have already been developed for improving the stability of the metal strip, which are installed in the area in which the vibration is to be minimized (for example, near the area in which the gas knives are located).

FIG. 3 is a view relating to an electromagnetic device currently employed for locally stabilizing a metal strip 4 during the feeding thereof within the scope of a coating process of the strip. The device in FIG. 3 consists of a plurality of pairs of electromagnetic actuators 10, 10', 10", 10"', each of which being formed by two electromagnets which face each other reciprocally. All pairs of electromagnetic actuators are aligned with at least one other pair of electromagnetic actuators according to a direction 100' orthogonal to the direction of the transportation direction 100 of the metal strip 4. Each pair of electromagnetic actuators is fed with current supplied by means of power amplifiers which may be controlled both with an open loop and with a closed loop. The control signal which determines the level of current which feeds the electromagnets in one pair of electromagnets is generated according to operating information such as the actual position of the metal strip 4 with respect to a theoretical pass-line, the thickness and uniformity of the coating, the thickness and/or width of the metal strip 4 or also the speed line. In particular, in the example illustrated in FIG. 3, the signal comes from position sensors 11, 11', 11", 11"' adapted to detect the position of the metal strip 4 with respect to a theoretical pass-line. More accurately, each sensor signal is used to activate the electromagnets facing each other of a corresponding pair of electromagnets. In essence, each signal provided by the position sensors 11, 11', 11", 11"' has the purpose of controlling a corresponding pair of electromagnets 10, 10', 10", 10"'. For this reason, the number of sensors 11, 11', 11", 11"' must necessarily correspond to the number of pairs of electromagnets 10, 10', 10", 10"'.

FIG. 4 is a top view of the device of FIG. 3 and shows the action of the electromagnets on the metal strip 4. In particular, the electromagnets in each pair of electromagnets 10, 10', 10", 10"' exert forces on the metal strip 4 the resultants 14, 14', 14" of which act on the metal strip 4 in very accurate points which however do not correspond to the theoretical points 15, 15', 15" in which the resultants themselves should be applied to make the metal strip 4 truly stable (i.e. coinciding with the theoretical plane 50), i.e. to block the oscillations thereof and compensate the static deformation thereof.

It is clear from that above that a limited number of electromagnets does not allow all the possible configurations which may be taken on by the metal strip 4, to be corrected. Likewise, it is also noted that a limited number of electromagnets determines further problems relating to the effect of the force exerted on the edges 4' of the metal strip 4. The resultant force exerted by each electromagnet indeed depends on the extension of the part of the metal strip 4 facing the electromagnets and hence varies as the transversal dimension (width 4") of the strip varies (see FIG. 7).

In this regard, FIGS. 5 and 7 each show a metal strip 4 and the force applied by four electromagnets 13. The two figures differ from each other in the reciprocal distance between the electromagnets 13 and in the different width 4" of the metal strip 4. It is noted that the forces generated by the four electromagnets 13 are applied locally so they are not effective at the edges 4' of the metal strip 4. This condition causes a necessary increase of the supply current on the electromagnets 13 to reach the level required by the compensation of the deformation. However, this determines a fast saturation of the electromagnets 13 and possible overload problems.

With reference to FIG. 6, an obvious improvement to the solution in FIG. 5 could be obtained by increasing the number of electromagnets 13 arranged along the transversal direction 100' and thus by bringing the electromagnets as close together as possible. However, this solution could lead to a substantially "notched" distribution of the forces acting on the metal strip 4 and in a significant increase of the number of power supply and cables required to drive the various electromagnets 13, with subsequent increased complexity of the device also in terms of control and the related costs thereof.

Another example of an electromagnetic device employed for stabilizing a metal strip 4 is shown in patent application WO2006/101446 in which, to solve the problem of the adaptation of the system to the variation of width of the strip, a minimum number of three electromagnets is provided which are suitable for eliminating the three main vibration mode shapes of the strip. In patent application EP1784520, side magnets are arranged to locally stabilize a metal strip, which are made movable so as to adapt their position according to the width of the metal strip, i.e. so as to concentrate the force if required at least at the edges of the strip. It is apparent that the two last solutions indicated certainly cannot be considered satisfactory because they are only relatively effective in the presence of certain vibration mode shapes, i.e. under certain and well-defined conditions of instability.

SUMMARY OF THE INVENTION

Hence, it is the primary task of the present invention to provide an electromagnetic device for stabilizing and reducing the deformation of a strip made of ferromagnetic material, e.g. a metal strip, during a process for coating the strip. Within the scope of this task, one object of the present invention is to provide an electromagnetic device capable of effectively reducing the vibrations of the ferromagnetic strip and capable of compensating for any static deformation (crossbow) generated in the strip. Another object of the present invention is to provide a device which, within the scope of a process based on the electromagnetic levitation of the liquid metal, is capable of eliminating the liquid metal leakage, induced by the magnetic field required for the levitation of the molten metal. Not last object of the present invention is to provide a device which is reliable and easy to make at competitive costs.

Therefore, the present invention relates to an electromagnetic device comprising first electromagnets aligned along a direction parallel to a first theoretical pass-line of said metal strip and orthogonal to a transportation direction of the strip, in turn parallel to said theoretical plane. The electromagnetic device also comprises second electromagnets positioned in a position mirroring said first electromagnets with respect to said theoretical pass-line of the metal strip. Each of the electromagnets includes a core comprising at least one pole and one feeding coil wound about said pole.

The electromagnetic device according to the invention also comprises a first connection element made of ferromagnetic material which connects said at least one pole of the first electromagnets, and a second connection element made of ferromagnetic material which connects said at least one pole of the second electromagnets. Such a second connection element is positioned in a position substantially mirroring the position of said first connection element with respect to said theoretical pass-line of said metal strip.

Furthermore, one other aspect of the present invention relates to a system for coating a strip made of ferromagnetic material comprising an electromagnetic device according to the present invention.

According to a further aspect of the invention, the above problem are solved by means of a process for stabilizing and/or correcting the deformation of a strip made of ferromagnetic material during the feeding thereof, implemented by means of the above device, said process comprising the steps of:

generating first independent magnetic fields and second independent magnetic fields in a position mirroring said first independent magnetic fields with respect to a theoretical pass-line of said strip;

conveying and distributing said first magnetic fields, through first means for conveying and distributing magnetic fields, so as to generate a first continuous magnetic field distributed along a transversal direction parallel to said strip;

conveying and distributing said second magnetic fields, by means of second means for conveying and distributing magnetic fields, so as to generate a second continuous magnetic field distributed along said transversal direction in a position mirroring said first continuous magnetic field generated by said first means for conveying and distributing magnetic fields.

BRIEF DESCRIPTION OF THE FIGURES

Further features and advantages of the invention will become more apparent in light of the detailed description of preferred, but not exclusive, embodiments of an electromagnetic device according to the present invention, disclosed by way of a non-limiting example, with the aid of accompanying drawings in which:

FIGS. 1 and 2 are schematic views relating to a first system and to a second system, respectively, for coating a metal strip;

FIGS. 18 and 19 are side views relating to possible embodiments of an electromagnet of the electromagnetic device in the figures from 8 to 11;

FIGS. 20 and 21 are side views relating to possible embodiments of an electromagnet of the electromagnetic device in the figures from 16 to 17;

The same numbers and the same reference letters in the figures identify the same elements or components.

DETAILED DESCRIPTION OF THE INVENTION

Figure 3:
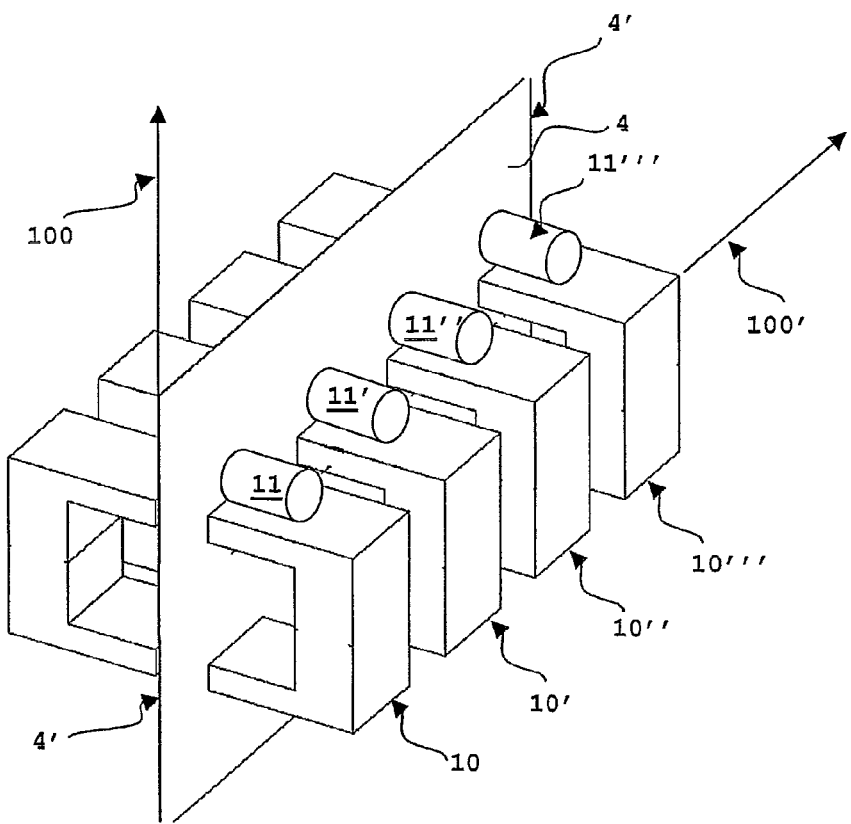
FIGS. 3 and 4 are a perspective view and a top view, respectively, of an electromagnetic device known from the state of the art.

The electromagnetic device 1 according to the present invention may be used for stabilizing a ferromagnetic strip (hereinafter more simply indicated as "strip 4") and minimizing the deformation thereof (e.g. cross-bow) preferably during a liquid metal coating process. In particular, the electromagnetic device 1 is particularly suited to be used for stabilizing a strip 4 within the scope of a system which performs a coating process such as for example, the one schematically shown in FIG. 1 or in FIG. 2. It will become apparent from the following description how the electromagnetic device according to the invention may also not only be used to correct any deformation on a strip made of ferromagnetic material, but possibly also to intentionally cause a deformation on the strip.

FIGS. 8 to 22 refer to possible embodiments of an electromagnetic device 1 according to the present invention. The electromagnetic device 1 according to the invention comprises first electromagnets 15, 15', 15", 15'" and second electromagnets 16, 16', 16", 16'". The first electromagnets 15, 15', 15", 15'" are aligned along a transversal direction 100' substantially parallel to a theoretical pass-line 50 of strip 4 and orthogonal to a transportation direction 100 parallel to said theoretical plane. Similarly, the second electromagnets 16, 16', 16", 16'" are aligned along a direction which is also parallel to the theoretical pass-line 50 of strip 4 and orthogonal to said transportation direction 100. More accurately, with respect to said theoretical plane 50, the first electromagnets 15, 15', 15", 15'" are positioned in a position mirroring the position taken on by the second electromagnets 16, 16', 16", 16'". For the objects of the invention, the expression theoretical pass-line 50 intends indicating a plane along which strip 4 should theoretically be supplied under an ideal condition of no vibrations and disturbances.

According to the present invention, each of the first and of the second electromagnets 15, 15', 15", 15'", 16, 16', 16", 16'" has a core comprising at least one pole and at least one coil wound about said pole and fed with a current whose intensity is preferably adjustable.

According to a preferred embodiment shown in the figures, the core has a substantially "E"-shaped structure, i.e. comprising three poles 18, 18', 18" and a yoke 19 which connects said poles 18, 18', 18" to each other. Said poles 18, 18', 18" and said yoke 19 may be made of ferromagnetic material, which is laminated or not laminated. More accurately, the core comprises a first pole 18, a second pole 18' in raised position with respect to said first pole 18 and a middle pole 18" in intermediate position between said first pole 18 and said second pole 18'. Each of said electromagnets 15, 15', 15", 15'", 16, 16', 16", 16'" also comprises at least one feeding coil wound about one of said poles 18, 18', 18". In an alternative embodiment not shown in the figures, the core of the electromagnets 15, 15', 15", 15'", 16, 16', 16", 16'" could only comprise two poles, about at least one of which a coil is wound. Hence, the core of the electromagnets 15, 15', 15", 15'", 16, 16', 16", 16'" could have a substantially "C"-shaped rather than an "E"-shaped structure like the one described above.

The first electromagnets serve the purpose of generating, by means of feeding the respective coil or coils, first magnetic fields on a first side of said strip 4. Therefore, such first magnetic fields are independently generated and adjusted. In other words, each of them may have, with respect to the others, a different intensity resulting from a different supply current of the coil or of the coils. Similarly, the second electromagnets 16, 16', 16", 16'" serve the purpose of generating second magnetic fields, which are also independent, in a position mirroring the one of the first magnetic fields.

According to the present invention, the electromagnetic device 1 also comprises a first connection element 26 made of ferromagnetic material and a second connection element 26' made of ferromagnetic material. The first connection element 26 connects the cores of the first electromagnets 15, 15', 15", 15'" to each other, while the second connection element 26' connects the cores of the second electromagnets 16, 16', 16", 16'". The first connection element 26 and the second connection element 26' have a mirroring position with respect to the theoretical feeding plane 50.

In particular, in the embodiments shown in the figures, the first connection element 26 connects the middle poles 18" of the first electromagnets 15, 15', 15", 15'" to each other, while the second connection element 26' connects the middle poles 18" of the second electromagnets 16, 16', 16", 16'".

Figure 8:
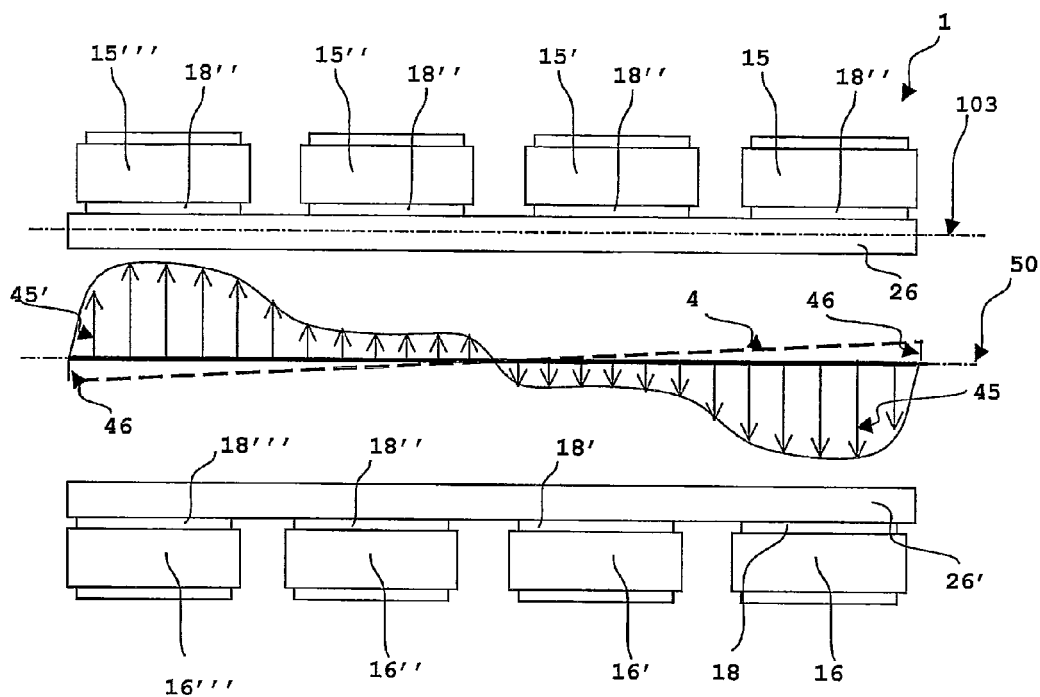
FIG. 8 is a top view relating to a first embodiment of an electromagnetic device according to the present invention.

FIG. 8 is a schematic view relating to a first embodiment of device 1 according to the present invention. The first connection element 26 and the second connection element 26' are preferably made in the shape of a bar with a rectangular section, made of ferromagnetic material, which is laminated or not laminated. As indicated above, the two connection elements 26, 26' have a mirroring position with respect to the theoretical plane 50 and are arranged so that the longitudinal axis 103 thereof is parallel to the transversal alignment direction 100' of the electromagnets 15, 15', 15", 15''', 16, 16', 16", 16''', i.e. orthogonal to the transportation direction 100 of strip 4. In particular, according to a preferred embodiment, the two connection elements 26, 26' have an extension measured along said transversal direction 100', which is greater than or equal to the extension of strip 4 measured along said transversal direction.

The first connection element 26 serves the purpose of conveying and distributing the first magnetic fields generated by the first electromagnets 15, 15', 15", 15''' by generating a first continuous magnetic field distributed along the transversal direction 100'. In essence, the first continuous magnetic field generated by the first connection element 26 consists of a "first magnetic field source" distributed in space, whose lines of force act on all the points of the cross section of strip 4. Similarly, the second connection element serves the purpose of conveying and distributing the second magnetic fields generated by the second electromagnets 16, 16', 16", 16''' by generating a second continuous magnetic field distributed along the transversal direction 100' in position mirroring the first continuous magnetic field generated by the first connection element 26. The second connection element 26' in essence consists of a "second magnetic field source" distributed in space in a position mirroring the first source defined by the first connection element 26.

By feeding the coils of various electromagnets with various currents and thanks to the two connection elements 26, 26', practically continuous distribution in space of the forces is obtained along the entire cross section of strip 4, regardless of the width thereof. To this end, it is pointed out that during processing, the width of strip 4 may also vary several times during the same campaign. The device according to the invention advantageously implements an intentional distribution of force regardless of the width of the strip. It is also noted how by uniformly generating a continuous and variable force along the entire length of strip 4, device 1 according to the invention—unlike the devices of the known art—does not require the use of moving parts for moving the source of force so as to also be able to exert forces on the edges of the strip.

The case shown in FIG. 8 with broken line indicates a possible deformation of the metal strip 4 (hereinafter also indicated as "deformation of the metal strip 4"), while the solid line indicates the position achieved by the metal strip 4 thanks to the device 1 according to the present invention. Hence by varying the feed of the coils of the electromagnets 15, 15', 15", 15''', 16, 16', 16", 16''' of device 1, in addition to obtaining a wanted orientation of the forces, it is also possible to obtain a continuous distribution thereof along the entire section of the metal strip 4 (i.e. substantially between the two edges 4'). This means that unlike that achieved by traditional devices, applied to each point of the cross section of the metal strip 4 is a determinate force which intensity and which orientation contribute to minimizing the deviation of the strip from the ideal condition (theoretical plane 50).

For example, in the case in FIG. 8, the forces 45 along a first half of the width of the metal strip 4 are oriented in a first direction to minimize a first deviation 46 from the correct theoretical position, i.e. from the theoretical passline 50. Instead, the other half of the metal strip 4 is subject to forces 45' oriented in a second direction opposite to the first because the direction of the deviation thereof from the theoretical plane 50 is also opposite.

Figure 4:
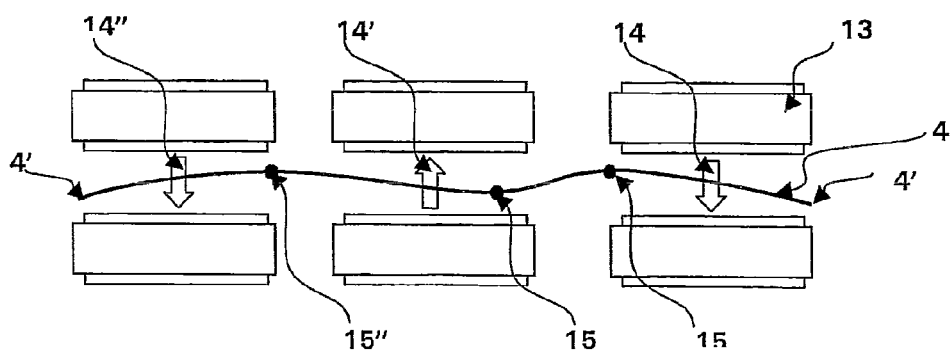
Figure 5:
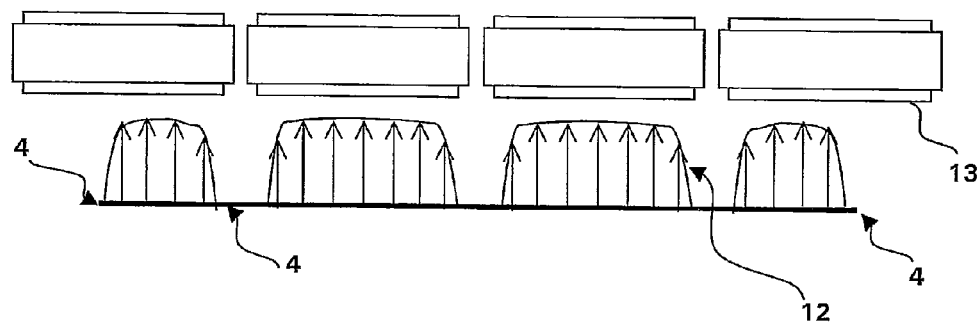
FIGS. 5, 6 and 7 are further views relating to electromagnetic devices known from the state of the art.
Figure 6:
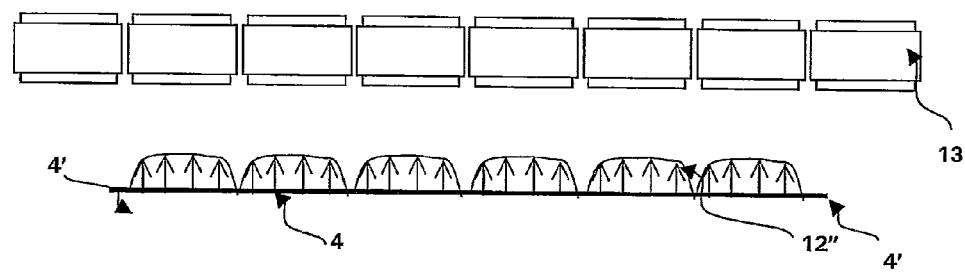
Figure 7:
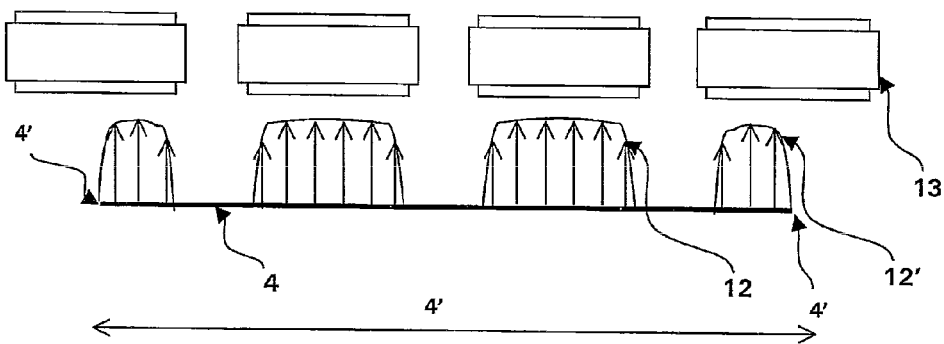
Figure 9:
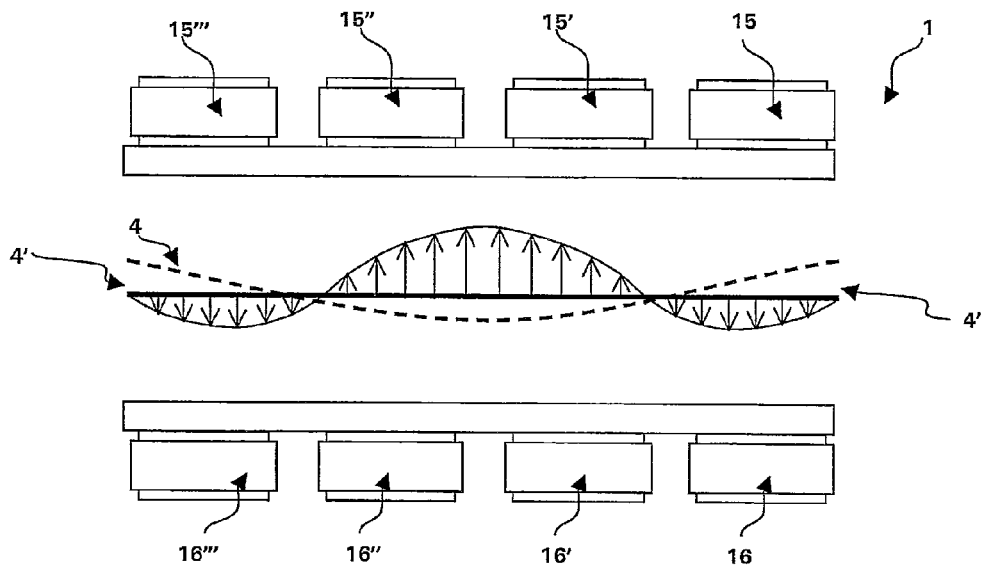
FIGS. 9 and 10 are views relating to possible applications of the electromagnetic device in FIG. 8.
Figure 10:
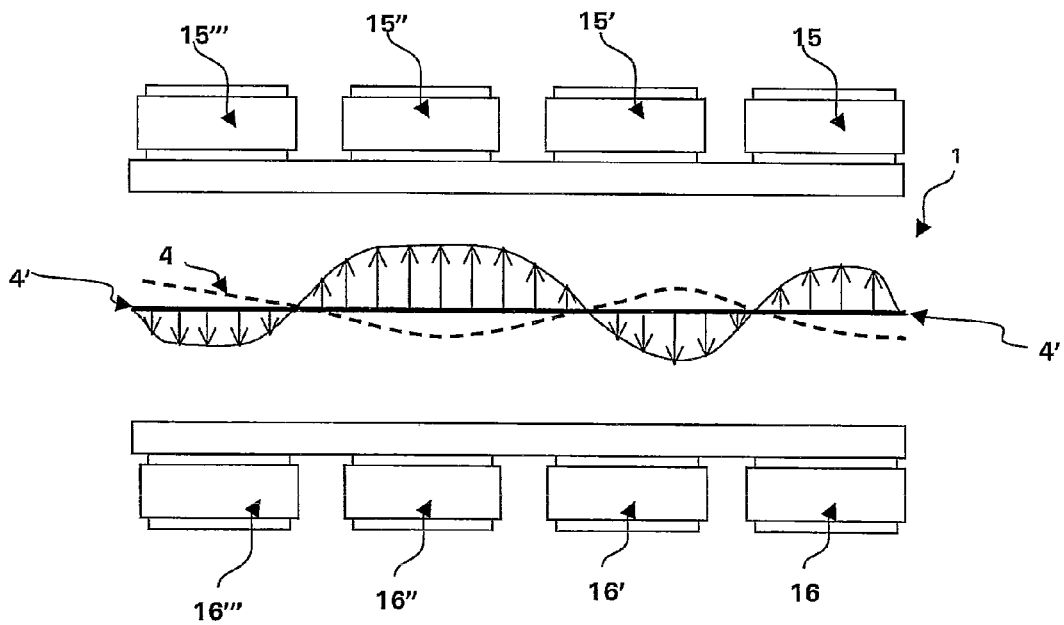
Figure 12:
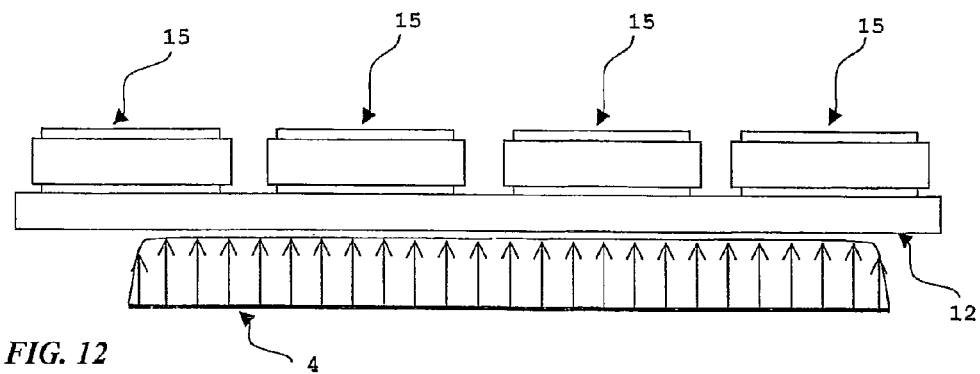
FIGS. 12, 13, 14 and 15 are views relating to possible operating modes of the electromagnetic device in FIGS. 8 and 9.

Instead, FIGS. 9 and 10 show other possible deformations of the metal strip 4 which may be corrected by means of an electromagnetic device 1 according to the present invention. In particular, it is noted that the deformation shown in FIG. 10 is comparable to the one shown in FIG. 4, which, as indicated above, may not be corrected effectively by means of traditional electromagnetic devices which provide a system of forces applied only to the portions of sections of the metal strip facing the electromagnets. Instead, the two connection elements 26, 26' provided in the electromagnetic device 1 according to the invention determine a distribution of forces which involves the entire section of the metal strip 4.

The possibility is apparent from the examples shown in FIGS. 8, 9 and 10, offered by the electromagnetic device 1 for correcting any deformation of the metal strip 4, i.e. the possibility of substantially keeping the metal strip 4 along the theoretical plane 50. The result is that the electromagnetic device 1 according to the invention is highly versatile from a functional point of view therefore it may be used, within the scope of a coating process, both to correct the vibrations generated by the removal units (gas or magnetic knives) and to correct the deformations generated by the rolls within the scope of coating based on an electromagnetic levitation of the liquid bath.

Figure 13:
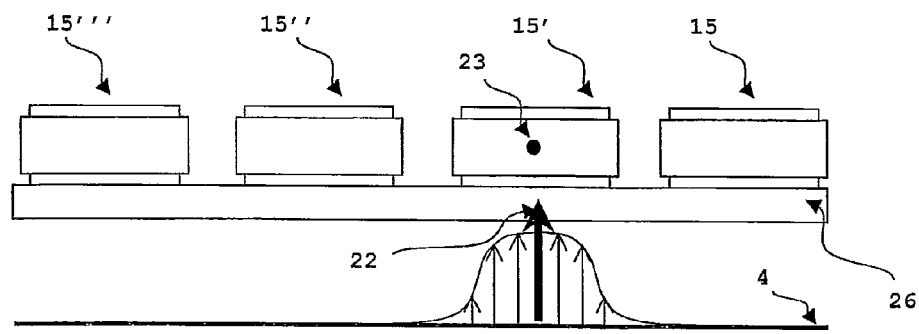
Figure 14:
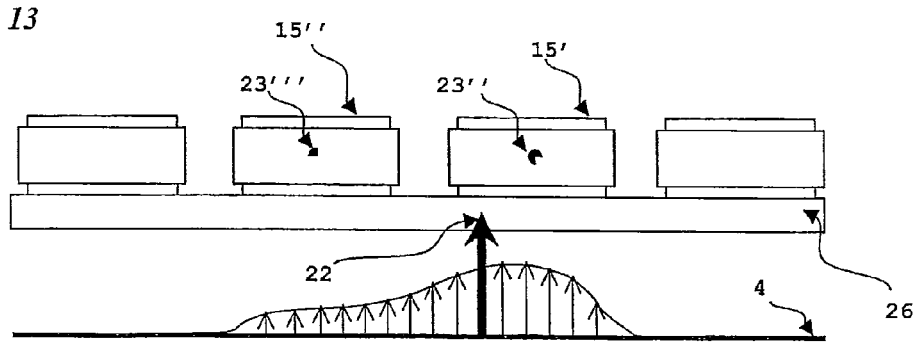
Figure 15:
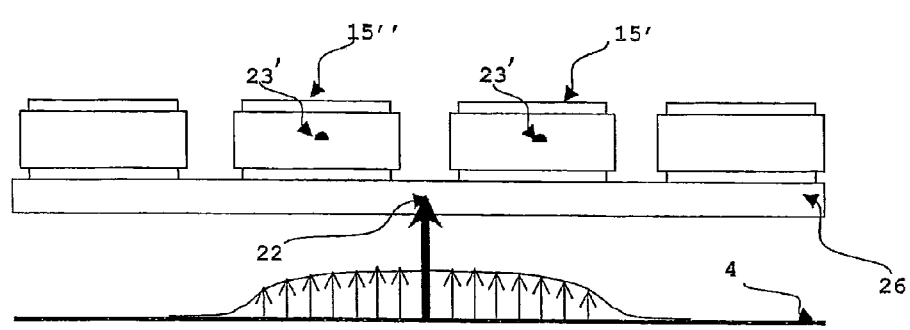

FIGS. 12 to 15 show further possible distributions of forces which can be obtained by conveniently varying the levels of current (indicated with references 23, 23', 23", 23''') which feed the coils of the electromagnets 15, 15', 15", 15''', 16, 16', 16", 16'''. The metal strip 4 and the first electromagnets 15, 15', 15", 15''' are only shown in such figures solely to simplify the depictions. FIG. 13 shows the distribution of the forces and in particular, the position of the related resultant force 22 obtained by feeding one of the present electromagnets (indicated with reference 15') with a first level of current 23. Instead, the distribution of forces shown in the schematization in FIG. 14 is determined by the simultaneous activation of two electromagnets 15' and 15" fed with two different levels of current 23" and 23'. Lastly, the distribution of force shown in FIG. 15 is the result of the simultaneous activation of two adjacent electromagnets 15', 15" whose feeding coils are fed with the same level of current 23'. It is noted from the comparison between FIGS. 13, 14 and 15 that the point of application of the resultant 22 of the forces varies according to the number and the position of the activated electromagnets, and also to the level of current which feeds the feeding coils of the electromagnets 15, 15', 15", 15''', 16, 16', 16", 16''' themselves.

FIGS. 18 and 19 laterally show an electromagnet (indicated with reference 15) which can be employed for the device already shown in FIGS. 8 to 11. In particular, FIG. 18 shows a preferred embodiment in which the electromagnet comprises a single feeding coil 17 wound about the middle pole 18" of the core. This solution advantageously allows the volumes of the coil to be contained in height.

Instead, FIG. 19 shows an alternative solution in which three feeding coils are provided: a middle coil 17 wound about the middle pole 18", a first auxiliary coil 17' wound about the first pole 18 and a second auxiliary coil 17" wound about the second pole 18'. In order to reduce the weights, the indicated feeding coils (the middle coil 17 and the auxiliary coils 17', 17") may also be water-cooled. Preferably the poles 18, 18', 18" have a prismatic shape with a rectangular section.

Yoke 19 of the core also has a prismatic shape with a rectangular section and connects the end sections 38 of the three poles 18, 18', 18" which are resting on a plane 51 which is substantially parallel to said theoretical plane 50. The middle pole 18" is connected to the related connection element 26 at a further end section 38' opposite to section 38 connected to yoke 19.

Figure 11:
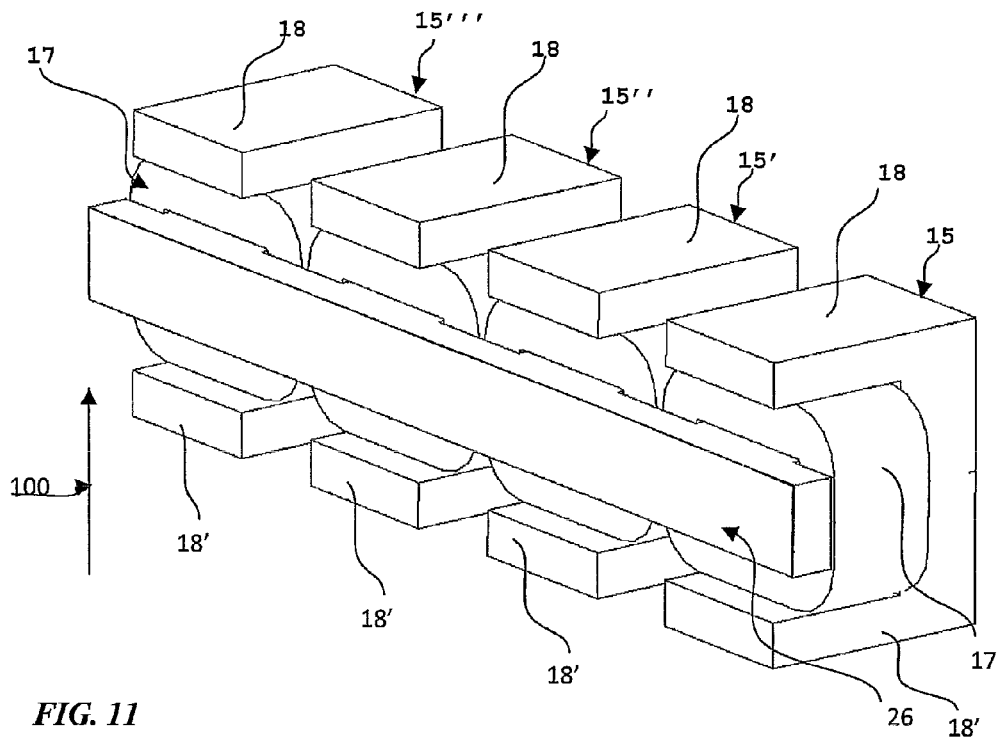
FIG. 11 is a perspective view of the electromagnetic device according to claim 8.

With reference to FIG. 11, the minimum section required for each of said connection elements 26, 26' is at least one fifth of the square of length 32 of a middle pole 18" connected by the connection element 26 itself. In particular, such a length 32 is measured along a direction substantially parallel to said theoretical moving plane 50. It has been seen that an optimal uniformity is obtained of the forces acting on the metal strip 4 by means of sections which are greater than or equal to such a minimum section, while at the same time preventing the saturation of the core.

Again, with reference to FIGS. 18 and 19, according to a preferred embodiment, the first pole 18 and the second pole 18' do not frontally extend beyond the related connection element 26, 26 connected to the middle pole 18", for each of said electromagnets 15, 15', 15", 15''', 16, 16', 16", 16''' of device 1. This in essence means that for each of said electromagnets 15, 15', 15", 15''', 16, 16', 16", 16''', distance 35 of the corresponding connection element 26, 26' from the theoretical plane 50 is less than, or equal to distance 35' of the first 18 and of the second 18' pole from the theoretical plane 50 itself (in particular, see FIG. 18). To this end, it is noted that such a distance 35' from the theoretical plane 50 is the same for said first 18 and for said second pole 18'.

Figure 16:
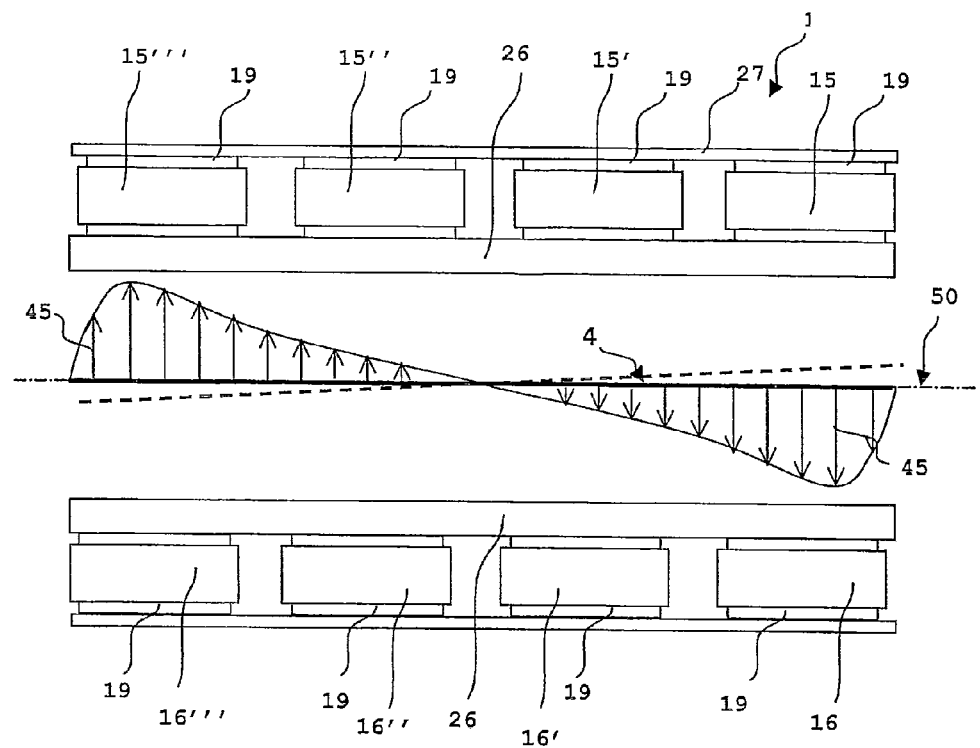
FIGS. 16 and 17 are a top view and a perspective view, respectively, relating to a second embodiment of an electromagnetic device according to the present invention.
Figure 17:
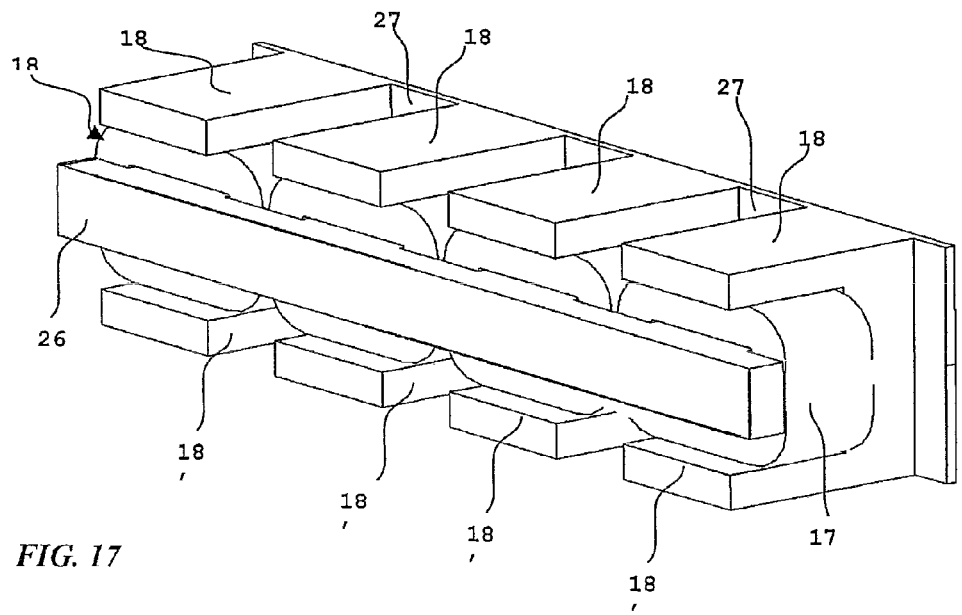

FIGS. 16 and 17 relate to a second embodiment of a device according to the present invention. In this case, device 1 comprises a first connection body 27 which connects the yokes 19 of the first electromagnets 15, 15', 15", 15''' to each other. Device 1 also comprises a second connection body 27' which connects the yokes 19 of the second electromagnets 16, 16', 16", 16''' to each other. In particular, the first connection body 27 connects the rear sections of the yokes 19 of the first electromagnets 15, 15', 15", 15''' to each other. The expression "rear section" in essence means the section of the yoke farthest from the theoretical pass-line 50. As shown in top view in FIG. 16, the second connection body 27' connects the rear sections of the yokes 19 of the second electromagnets 16, 16', 16", 16''' in an entirely similar way.

FIGS. 20 and 21 are side views which show the configuration of an electromagnet relating to the electromagnetic device shown in FIGS. 16 and 17. In particular, FIG. 20 shows the presence of one single coil 17 wound about the middle pole 18", similarly to what indicated for the solution in FIG. 18. Instead, FIG. 21 shows a solution which provides three coils 17, 17', 17" similarly to what provided for the solution in the above-described FIG. 17. With regards to what described above for the solutions in FIGS. 18 and 19, the solutions in FIGS. 20 and 21 are also to be considered valid.

According to an embodiment accurately shown in FIGS. 20 and 21, the first connection body 27 and the second connection body 27' are obtained in the shape of a plate made of ferromagnetic material, which is laminated or not laminated. In particular, such a plate has a section which height 37, measured according to a direction parallel to the theoretical pass-line 50, is greater than, or equal to each height of the yokes 19 connected by the same connection body. Furthermore, each of said connection bodies 27, 27' in the shape of a bar has a thickness of at least 1 mm measured according to a direction orthogonal to said theoretical pass-line 50.

It has been noted that an even greater distribution and uniformity of the forces exerted by the electromagnets on strip 4 is obtained by employing the two connection bodies 27, 27'. To this end, considering FIG. 16 again, a different distribution of the forces 45, 45' is noted with respect to the distribution which is obtainable by the device in FIG. 8, the deformation of strip 4 being equal. In particular, it is noted that in the solution in FIG. 16, a more progressive distribution of the forces is obtainable with respect to the one in FIG. 8 and hence an even more effective correction of the position of strip 4. It has also been noted that the presence of the two connection bodies 27, 27' also advantageously reduces the saturation of the core of the electromagnets 15, 15', 15", 15''', 16, 16', 16", 16''' with related advantages that this involves in terms of operability of device 1.

Figure 22:
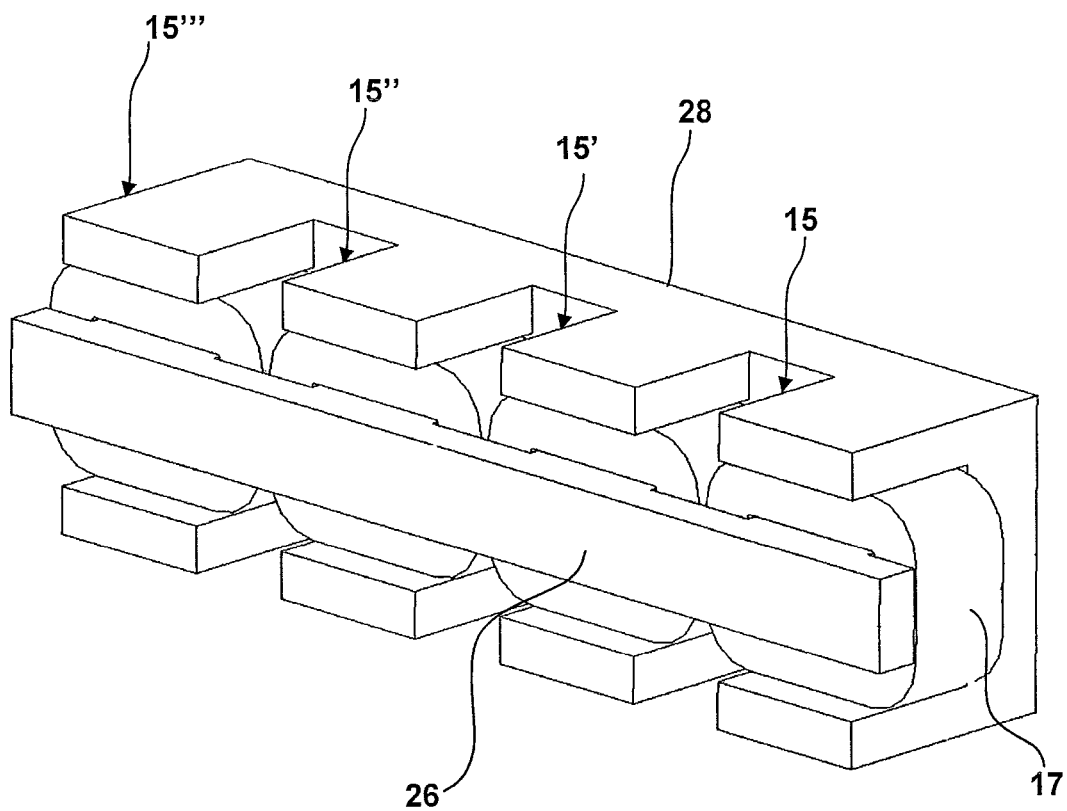
FIG. 22 is a perspective view relating to a third embodiment of a device according to the present invention.

To this end, FIG. 22 shows a further possible embodiment of the electromagnetic device 1 according to the invention in which the yokes 19 of the cores of the first electromagnets 15, 15', 15", 15''' are made in a single piece, i.e. in a single body 28. Similarly, the yokes 19 of the cores of the second electromagnets 16, 16', 16", 16''' are also made in a single body (not shown in the figures).

The solution in FIG. 22 significantly increases the magnetic efficiency of the electromagnetic device 1 thus further limiting the problems relating to saturation. It is also noted that for this further solution, the use of a "single body" 28 provides increased rigidity to the structure of the electromagnetic device 1 by likewise being able to advantageously be shaped to form the metal support structure of the device. In particular, such a single body 28 can also be equipped with fixing members for allowing the positioning thereof, for example, within a system for coating strip 4 as those schematized in FIGS. 1 and 2.

For any of the above-described embodiments, the electromagnetic device 1 according to the invention comprises a plurality of position sensors adapted to detect the position of predetermined points on strip 4 with respect to the theoretical pass-line 50. According to the type of position sensors, they may be positioned more or less close to the region of space delimited by a first side by said first connection element 26 and by a second side, opposite to the first, by said above-described second connection element 26'.

For any of the above-described embodiments, the activation of the electromagnets 15, 15', 15", 15''', 16, 16', 16", 16''' of device 1 (i.e. the feeding of the coils of the electromagnets) is controlled according to the information deriving from the above sensors. To this end, the employment of eddy-current sensors has been shown to be particularly advantageous. However, it is understood that other types of sensors could be employed, for example of capacitive type or laser sensors.

According to a preferred embodiment, the eddy-current sensors are preferably fewer in number than the number of electromagnets of device 1. Each of these sensors is positioned so as to detect, in a predetermined point, the position of strip 4, i.e. the deviation thereof from a reference plane which may be, for example, the theoretical plane 50. The signals deriving from such sensors are sent to a processing unit which processes them to reconstruct the true shape of the strip (deformation). In particular, the processing unit implements an interpolating function which starting from known points, reconstructs the true shape of strip 4. According to the true shape of strip 4, the processing unit determines the distribution of the forces to be applied to the strip in order to minimize the deviation thereof from the theoretical pass-line 50. According to such a distribution, a unit for controlling the electromagnets (possibly corresponding to the processing unit) controls the supply of the feeding coils 17, 17', 17" of the electromagnets 15, 15', 15", 15''', 16, 16', 16", 16''' by assigning sufficient levels of current to generate the forces required.

It is noted that, unlike traditional electromechanical devices, the sensor signals are advantageously used to simultaneously control the feeding of all the electromagnets of the electromagnetic device. Obviously, this allows a more accurate and uniform correction. Moreover, the employment of an interpolating function for calculating the deformation of the strip advantageously allows to reduce the number of sensors to be applied—and therefore the overall costs—to be contained.

According to a preferred device, the eddy-current sensors are positioned on both sides of strip 4 so as to be, two by two, in a symmetrical position with respect to the theoretical pass-line 50. It has been noted that this particular arrangement allows to automatically calibrate the measuring system by starting from the knowledge of the distance between the two sensors reciprocally facing each other because such a distance is known. This particular arrangement of the sensors also allows the noise to be reduced which may be generated on the signal of one of the sensors due to the proximity of the magnetic fields generated by the electromagnets 15, 15', 15", 15''', 16, 16', 16", 16'''.

The electromagnetic device according to the invention allows to accomplish the preset tasks and objects. In particular, the device allows the oscillations and deformations of the strip to be minimized. This involves an advantageous reduction of the over-coating required to ensure the minimum coating threshold required. The increased stability of the strip also allows to increase the production line speed thereof and this is obviously translated into reduced production costs i.e. increased productivity. At the same time, the superficial quality of the coating is highly improved. The device according to the invention also proves to be highly versatile from an operational point of view because it is capable of effectively adapting to the various widths of metal strips.

The present invention also relates to a system for coating a metal strip 4 which comprises at least one device 1 according to that described above, for stabilizing the position of the metal strip 4 during the feeding thereof. In a first embodiment, the system may be of the type schematized in FIG. 1 or alternatively of the type schematized in FIG. 2. In both cases, the system according to the invention comprises a unit for removing the excess coating. Such a unit comprises gas knives and/or magnetic knives.

According to a first installation mode, device 1 according to the invention may be positioned on the support structure which also carries said unit for removing the excess coating. By means of the sensors belonging to the electromagnetic device 1, this operating position allows the actual position of the metal strip 4 to be known with respect to the gas knives 5 and/or the magnetic knives of the removal unit. This allows the knives to be neared/distanced according to the true position of the strip and this translates into a subsequent saving of gas or of electric energy in the case of electromagnetic knives.

In the case of a system of the type in FIG. 2, the electromagnetic device 1 according to the invention may also be positioned below magnetic levitation pot 111'. This position allows the reduction of the vibration of the metal strip 4 induced by the action of the intense magnetic fields required for the levitation of the molten metal 7.

The process for stabilizing and/or correcting the deformation of a strip 4 made of ferromagnetic material (e.g. a metal strip) of the present invention provides generating first independent magnetic fields and second independent magnetic fields in position mirroring the first magnetic fields with respect to a theoretical pass-line 50 of strip 4. The process provides conveying and distributing said first magnetic fields, by means of first means for conveying and distributing magnetic fields, so as to generate a first continuous magnetic field distributed along a transversal direction 100' parallel to said strip 4. The process according to the invention also provides conveying and distributing said second magnetic fields, by means of second means for conveying and distributing magnetic fields, by generating a second continuous magnetic field and distributed in position mirroring the one of said magnetic field distributed with respect to said theoretical pass-line 50 of strip 4.

The first magnetic fields and the second magnetic fields are generated by means of electromagnets comprising at least one core and one feeding coil. The supply of electric current in the feeding coil generates a magnetic field which is concentrated in the core of the respective electromagnet. Essentially, the single feeding coils consist of sources of independent magnetic fields which act in a concentrated area of space. By means of the first means and the second means for conveying and distributing magnetic fields, the first and the second magnetic fields are essentially redistributed in the space so as to generate a first source distributed in the space (i.e. the first continuous magnetic field) and a second source distributed in the space (i.e. the second continuous magnetic field).

During feeding, strip 4 is arranged between the two continuous magnetic fields thus generated so that any point of the cross section thereof is magnetized, i.e. it is subjected to the effects of forces generated by the continuous magnetic fields. Essentially, the magnetization of strip 4 occurs as reflected action of the presence of the first and of the second magnetic field generated by the first and second conveying and distributing means, respectively. Generated on each point of the cross section of strip 4 are forces whose distribution, in terms of intensity and direction, corresponds to the one of the continuous magnetic fields generated by conveying and distributing the first and the second magnetic fields generated by the electromagnets.

It is apparent that the electromagnetic device 1 in the embodiments shown in the above-described figures accurately allows the process according to the invention to be carried out. In particular, it is noted that in the case of the electromagnetic device 1, the first magnetic fields are generated by the first electromagnets 15, 15', 15", 15''', while the second magnetic fields are generated by the second electromagnets 16, 16', 16", 16'''. The first means for conveying and distributing magnetic fields consist of the first connection element 26. Similarly, the second means for conveying and distributing magnetic fields consists of the second connection element 26' mirroring the first.

It is noted that the process according to the invention may be used to stabilize and minimizing the deformation of a metal strip during the feeding thereof within the scope of a production process, but could also be employed to induce, although not to necessarily reduce and eliminate, a deformation on a strip made of ferromagnetic material.

The invention claimed is:

1. An electromagnetic device for stabilizing and reducing the deformation of a strip made of ferromagnetic material during its feeding, said device comprising:
   first electromagnets aligned along a transversal direction parallel to a theoretical pass-plane of said strip and orthogonal to a transportation direction of said strip;
   second electromagnets arranged in a position mirroring the first electromagnets with respect to said theoretical pass-plane of said strip,
wherein each of said first and second electromagnets comprises a core provided with at least one pole and at least one feeding coil wound about said at least one pole and wherein said device further comprises:
   a first connection element made of ferromagnetic material which connects the cores of said first electromagnets, the first connection element being in an intermediate position between said cores of said first electromagnets and said theoretical pass-plane;
   a second connection element made of ferromagnetic material which connects the cores of said second electromagnets, said second, connection element being placed in a position mirroring the position of said first connection element with respect to said theoretical pass-plane of said strip made of ferromagnetic material.

2. The electromagnetic device according to claim 1, wherein each of said first and second electromagnets comprises:
   a first pole;
   a second pole in a position above said first pole;
   a middle pole interposed between said first pole and said second pole;
   a yoke which connects said first pole, said second pole and said middle pole;
and wherein said first connection element made of ferromagnetic material connects the middle poles of said first electromagnets and wherein said second connection element made of ferromagnetic material connects the middle poles of said second electromagnets.

3. The electromagnetic device according to claim 1, wherein said device comprises a plurality of position sensors adapted to measure the position of said strip with respect to said theoretical pass-plane, each feeding coil of each of said electromagnets being fed according to said position of said strip with respect to said theoretical pass-plane.

4. The electromagnetic device according to claim 2, wherein said device comprises a plurality of position sensors adapted to measure the position of said strip with respect to said theoretical pass-plane, each feeding coil of each of said electromagnets being fed according to said position of said strip with respect to said theoretical pass-plane.

5. The electromagnetic device according to claim 3, wherein said sensors are placed on opposite sides with respect to said theoretical pass-plane of said strip so as to be, two by two, in a mirroring position with respect to said theoretical pass-plane.

6. The electromagnetic device according to claim 4, wherein said sensors are placed on opposite sides with respect to said theoretical pass-plane of said strip so as to be, two by two, in a mirroring position with respect to said theoretical pass-plane.

7. The electromagnetic device according to claim 2, wherein said at least one feeding coil is wound about said middle pole.

8. The electromagnetic device according to claim 2, wherein each of said electromagnets comprises:
   a middle feeding coil wound about said middle pole;
   a first auxiliary feeding coil wound about said first pole;
   a second auxiliary feeding coil wound about said second pole.

9. The electromagnetic device according to claim 1, wherein said first and second connection elements have an extension, measured according to said transversal direction, which is greater than or equal to the extension of said strip, also measured along said transversal direction.

10. The electromagnetic device according to claim 1, wherein said first and second connection elements consist of a bar made of ferromagnetic material which is laminated or not laminated and with a rectangular section, said bar having a section which is greater than or equal to one fifth of the square of the length of each middle pole connected by the bar itself.

11. The electromagnetic device according to claim 1, wherein the distance of one of said first and second connection elements from said theoretical pass-plane is less than or equal to the distance of said first pole and of said second pole from the same theoretical plane, said distances being measured according to a direction orthogonal to said theoretical pass-plane.

12. The device according to claim 1, comprising:
   a first connecting body made of ferromagnetic material which connects the individual yokes of the first electromagnets to one another;
   a second connecting body made of ferromagnetic material which connects the individual yokes (19) of the second electromagnets to one another.

13. The device according to claim 12, wherein each of said connecting bodies comprises a plate made of ferromagnetic material having a rectangular section and wherein, for each of said connecting bodies the height of said section measured according to a direction parallel to said theoretical pass-plane, is greater than or equal to the height of the connected yokes.

14. The device according to claim 2, wherein the yokes of the first electromagnets and/or the yokes of said second electromagnets are made in a single body.

* * * * *